April 12, 1960  W. E. PARKER ET AL  2,932,452
MIXING VALVE FOR GAS TURBINE COMPRESSOR
Filed Nov. 23, 1956  3 Sheets-Sheet 2

WILTON E. PARKER,
ALEXANDER SILVER,
INVENTORS.

BY John H. J. Wallace

April 12, 1960  W. E. PARKER ET AL  2,932,452
MIXING VALVE FOR GAS TURBINE COMPRESSOR
Filed Nov. 23, 1956  3 Sheets-Sheet 3
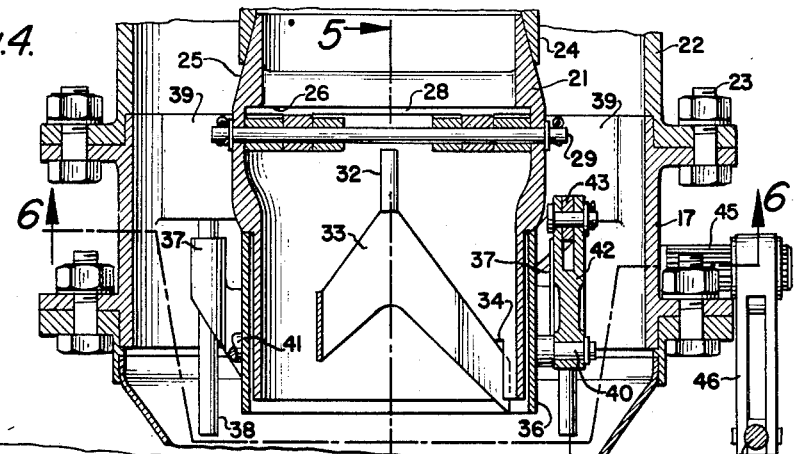
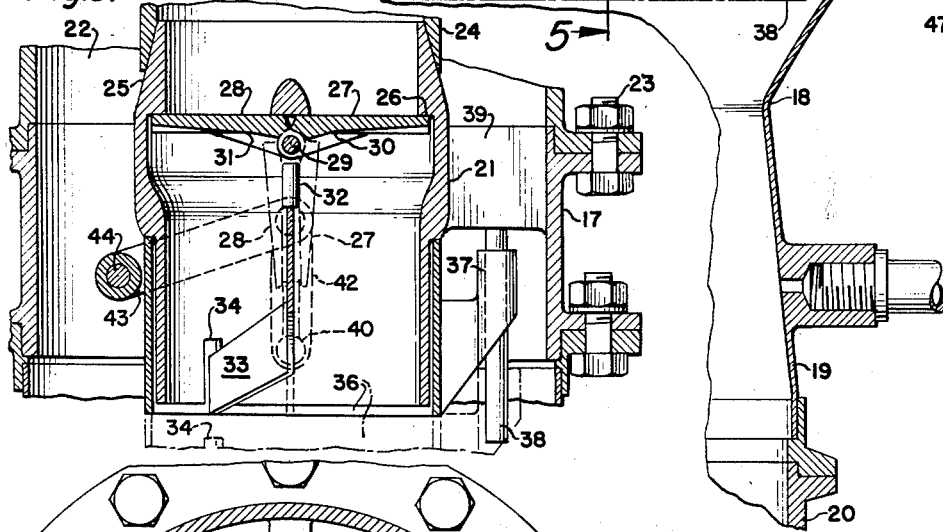
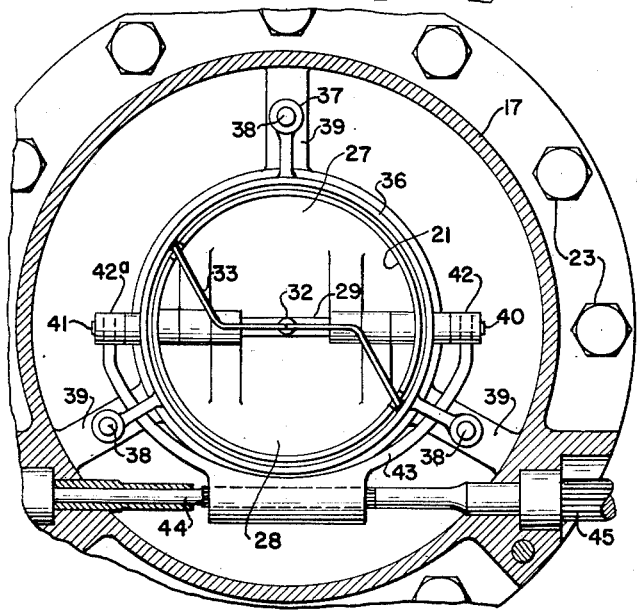
WILTON E. PARKER,
ALEXANDER SILVER,
INVENTORS.
BY John H. G. Wallace United States Patent Office 2,932,452
Patented Apr. 12, 1960

2,932,452

MIXING VALVE FOR GAS TURBINE COMPRESSOR

Wilton E. Parker, Encino, and Alexander Silver, Tarzana, Calif., assignors to The Garrett Corporation, Los Angeles, Calif., a corporation of California Application November 23, 1956, Serial No. 623,992

5 Claims. (Cl. 236—12)

This invention relates to a valve and system for mixing hot and cold fluid being bled from a gas turbine compressor.

The term, gas turbine compressor, is used in this application to identify a machine wherein a compressor furnishes combustion supporting air to operate a turbine which drives the compressor, and wherein means is provided to bleed a portion of the compressed air from the compressor for various other uses.

Gas turbine compressors are used on airplanes, or as portable auxiliary equipment at airports for operating various airplane accessories such as pneumatic starters for airplane engines.

Pneumatic starters for large airplane engines use a considerable amount of power. A large pneumatic starter requires a correspondingly large gas turbine compressor to operate it. Since the pneumatic starters are often the greatest power consumers of all the aircraft accessories, the gas turbine compressor usually is designed to accommodate the engine starter.

The temperature of compressed air directly affects the energy content thereof, or more properly, the adiabatic head. It is possible to raise the temperature of the bleed air delivered by a gas turbine compressor by mixing products of combustion with the compressed air. The products of combustion are obtained from the turbine combustor and are mixed with the compressed air, greatly augmenting its enthalpy.

A gas turbine compressor arranged to deliver mixed compressed hot gas and air is capable of delivering considerable energy to a pneumatic starter. Therefore, a gas turbine compressor so equipped, may operate a more powerful pneumatic starter than if compressor bleed air at normal compressor output temperature is utilized. It will be understood that the proportional relationship of a gas turbine compressor to a dependent pneumatic starter may indicate a relative minimum bulk and weight in favor of the gas turbine compressor when it employs means to deliver compressed air at high temperature. It is sometimes desirable to bleed selectively either hot compressed air augmented as described, or uncontaminated compressed air from a gas turbine compressor. Since weight and bulk of conduits in an airplane are critical, it is often necessary to alternately supply both hot compressed air and uncontaminated compressed air through the same conduit. When fresh compressed air from the gas turbine compressor is used as breathing air for occupants of an airplane, no contamination of the air is permissible.

According to the present invention a valve and system, for mixing hot and relatively cool fluids bled from a gas turbine compressor, provides for alternate delivery of either mixed compressed air or uncontaminated, breathable air through the same conduit.

The present valve and control system is fully automatic when operation thereof is initiated, whereby a predetermined temperature of delivered hot compressed air is maintained by thermostatically controlled mixing of compressor bleed air and the products of combustion from a gas turbine compressor.

The mixing valve of the present invention is capable of delivering uncontaminated air from a gas turbine compressor, due to a pressure differential between compressor bleed pressure and pressure within the gas turbine combustion chamber. The mixing valve communicates with a compressor output conduit and also the combustion chamber of a gas turbine compressor, and a check valve in the mixing valve is employed to prevent flow from said compressor output conduit into said combustion chamber when uncontaminated air is delivered through said mixing valve.

It is an object of the invention to provide a valve and system for mixing hot and cold fluids bled from a gas turbine compressor, for the purpose of increasing the deliverable pneumatic energy.

Another object of the invention is to provide a mixing valve having a novel arrangement of a concentric aspirator and check valve for mixing fluids or delivering one of them individually.

Another object of the invention is to provide a mixing valve which may be used in connection with a gas turbine compressor to deliver mixed compressor bleed air and products of combustion, or, alternately, fresh breathable air.

Still another object of the invention is to provide a valve and system for mixing hot and cold fluids being bled from a gas turbine compressor, whenever a pneumatic aircraft engine starter is to be driven thereby.

A further object of the invention is to provide a mixing valve and system for delivering high temperature fluid from a gas turbine compressor, whereby the flow demand regulates an optimum position of the mixing valve element to meet the demand.

A still further object of the invention is to provide a mixing valve of this class which is essentially balanced and requires minimum actuating forces.

A still further object of the invention is to provide a mixing valve for use in connection with gas turbine compressors, wherein regenerative heat exchange occurs between conduits delivering fluids of different temperatures to be mixed.

An additional object of the invention is to provide a valve and system for mixing hot and cold fluids which is efficient, durable and reliable in its operation.

Further objects and advantages of the invention will appear from the following specification, appended claims and drawings in which:

Fig. 4 is an enlarged fragmentary sectional view of the mixing valve taken along the line 4—4 of Fig. 3;

Fig. 5 is a fragmentary sectional view of the mixing valve taken along the line 5—5 of Fig. 4; and Fig. 6 is a fragmentary transverse sectional view of the mixing valve taken along the line 6—6 of Fig. 4.

Figure 1:
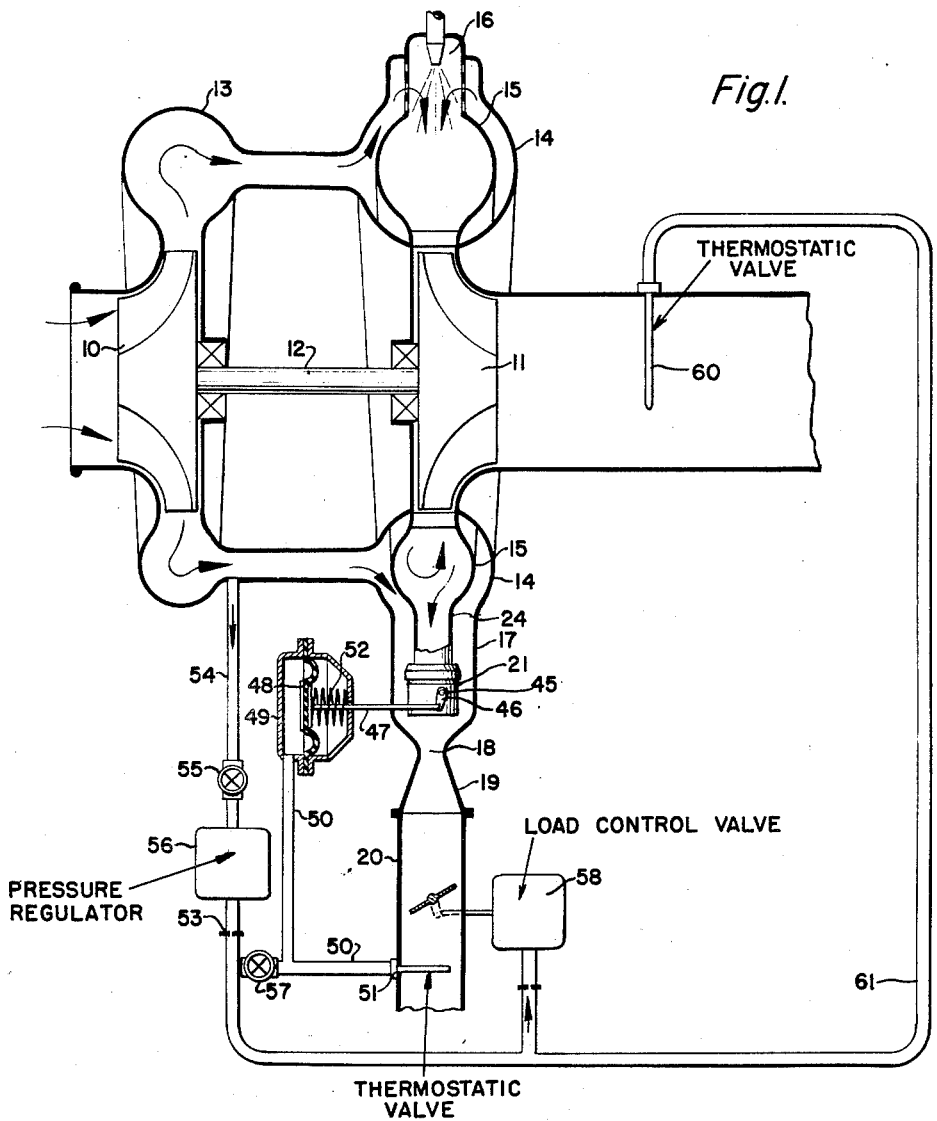
Fig. 1 is a diagrammatic view of the present invention showing a gas turbine compressor having a valve and system for mixing hot and cold fluids being bled from the machine.
Figure 2:
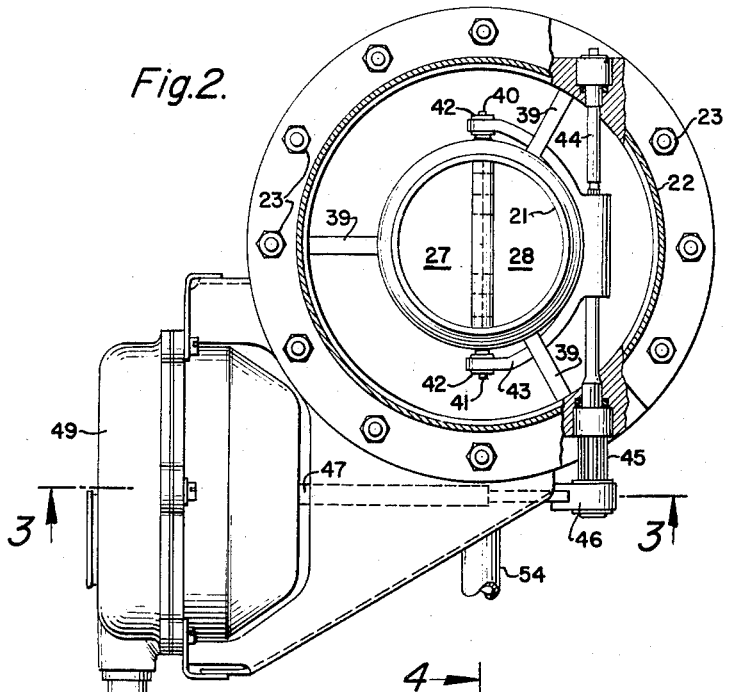
Fig. 2 is an enlarged end view of the mixing valve showing portions thereof broken away and portions in section.
Figure 3:
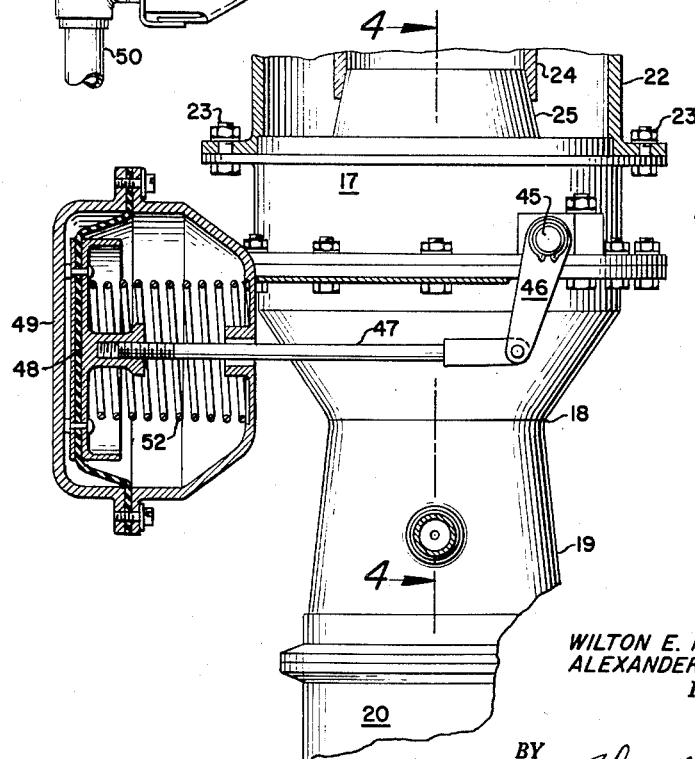
Fig. 3 is a sectional view of the mixing valve taken on the line 3—3 of Fig. 2, showing parts and portions in elevation.

As shown diagrammatically in Fig. 1 of the drawing, the present invention is used with a gas turbine compressor having a compressor impeller 10 coupled to a turbine wheel 11 by means of a shaft 12. The compressor is provided with an output plenum or scroll 13, which communicates with a secondary scroll or air conducting plenum 14 surrounding a turbine inlet plenum 15 which communicates with the turbine wheel 11. A combustor 16 is arranged to receive air from the compressor output scroll 13 and to deliver products of combustion to the interior of the turbine inlet plenum 15.

Communicating with the plenum 14 and the compressor output scroll 13 is a valve casing 17, which is a substantially cylindrical structure having a restriction 18 therein. Communicating with the restriction 18 is an outlet diffuser 19 coupled to a conduit 20 which is arranged to deliver compressed fluid to a use location. Communicating with the interior of the turbine inlet plenum 15 is a conduit 21 located concentrically in the valve casing 17. Conduit 21 is arranged to conduct hot products from the combustion chamber 15 into the casing 17 of the fluid mixing valve.

Referring to Figs. 1 and 4 of the drawing, it will be seen that the air conducting plenum 14 is provided with a flanged conduit portion 22 which is connected to the casing 17 by means of bolts 23. The turbine inlet plenum 15 is provided with an extending tubular portion 24 into which an externally tapered portion 25 of the conduit 21 is fitted. Thus, the interior of the conduit 21 communicates with the turbine inlet plenum 15. While the valve casing 17 is arranged to conduct compressed air from the compressor 10 the conduit 21 is arranged to conduct hot combustion gas from the turbne inlet plenum 15. A regenerative heat exchange relationship of the hot gas relative to the cool air passing through the valve is thus accomplished.

It will be understood that fluid pressure in the valve casing 17 which communicates directly with the compressor 10 is higher than fluid pressure in the turbine inlet plenum 15 and conduit 21. This is due to the fact that the compressed air conducted from the compressor 10 passes through the combustor 16 before it enters the turbine inlet plenum 15, entailing a pressure drop. It will be understood, therefore, that any leakage which may occur at the joinder of the conduit 21 and portion 24 of the turbine inlet plenum 15, will pass from the casing 17 into the turbine inlet plenum 15, and thus contamination of breathable air which may be conducted through the casing 17 cannot occur.

The conduit 21 is provided with an annular internal valve seat portion 26 arranged to engage hinged check valve elements 27 and 28 which are pivoted on a pin 29 extending diametrically through the conduit 21. The check valve elements 27 and 28 are substantially semicircular members and are arranged to be pivoted into an open position, as shown by broken lines in Fig. 5 of the drawings, wherein their sides are disposed substantially parallel to the axis of the conduit 21. The check valve elements 27 and 28 at their adjacent sides, when in the open broken line position, as shown in Fig. 5 of the drawing, overlap at their angularly disposed inclined cam portions 30 and 31 which are arranged to be engaged by a spreader plunger 32 carried by a cross member 33 extending through slots 34 in the side wall of the conduit 21.

The outer ends of the cross member 33 are fixed to an axially adjustable sleeve 36 which is reciprocally mounted and surrounds the conduit 21. Sleeve 36 is arranged to provide for axial extension of the conduit 21 toward the restriction 18 of the valve casing 17 in order to adjust the aspirating effect of fluid passing through the casing 17 on fluid in the conduit 21. The sleeve 36 is provided with bearings 37 extending outwardly thereof and slidably mounted on stationary rods 38 fixed to struts 39 which support the conduit 21 concentrically in the casing 17, as shown best in Fig. 6 of the drawing.

Extending from the outside of the sleeve 36 are trunnions 40 and 41 having links 42 and 42a pivotally connected therewith. Opposite ends of the links 42 and 42a are pivotally connected with the ends of a yoke 43 which is fixed to an actuating rod 44 pivotally mounted in the valve casing 17. The rod 44 is provided with an extending portion 45 on which a lever 46 is fixed. Pivotally connected to the lever 46 is a rod 47 which is connected to a diaphragm 48 disposed in a diaphragm casing 49.

Referring to Fig. 1, a spring 52 engages the diaphragm 48 and tends to force it in a direction to oppose fluid pressure in the casing 49. The interior of the diaphragm casing 49 is connected to a thermostatic valve 51, which may be of a type shown in U.S. Patent 2,749,047 to Donald A. Dotson, by means of a tube 50. Control fluid pressure is conducted from the output of the compressor 10 through a tube 54 to the tube 50. The thermostatic valve 51 is arranged to sense fluid temperature downstream from the diffuser 19 for the purpose of controlling operation of the diaphragm 48 to actuate the sleeve 36 relative to the restriction 18 in order to modulate the mixture of the hot combustion products and compressed air passing through the casing 17.

The thermostatic valve 51 is a normally closed valve and is arranged to open at a predetermined temperature and to vent the tube 50 downstream from an orifice 53 whereupon pressure in the diaphragm casing 49 will be reduced and the spring 52 will force the diaphragm 48 in the opposite direction to that caused by pressure in the casing 49. Since the orifice 53 is more restricted than the valve 51, it cannot supply fluid pressure to make up for that which flows through the valve 51 when it is open. Thus, by this means the aspirating effect is modulated by the sleeve 36 so as to maintain a constant temperature at the thermostat 51.

The control pressure supply tube 54 communicating with the output of the compressor 10 is provided with a solenoid shutoff valve 55 and a pressure regulator 56 upstream of the orifice 53. A second solenoid shutoff valve 57 is disposed intermediate the orifice 53 and the supply tube 50 which communicates with the diaphragm chamber 49. Also communicating with the orifice 53 are a load control valve 58 and a thermostatic valve 60 located in the turbine discharge duct which may be of a type disclosed in the co-pending application of Alexander Silver, Serial No. 400,638, filed December 28, 1953. This load control valve 58 modulates flow through the conduit 20 downstream of the fluid mixing valve in order to coordinate operation of the gas turbine compressor with the total fluid bleed demand.

The operation of the valve and system for mixing hot and cold fluids being bled from a gas turbine compressor in accordance with the present invention is substantially as follows.

Referring to Fig. 1, when the gas turbine compressor is operating, the compressor impeller 10 on the shaft 12 is driven by the turbine wheel 11 which receives products of combustion from the turbine inlet plenum 15 into which the combustor 16 discharges. The combustor 16 receives air from the compressor which is mixed with fuel in the combustion chamber 15. As hereinbefore described, the compressor output fluid pressure in the plenum 14 is greater than the pressure in the turbine inlet plenum 15 due to the fact that air passing from the compressor plenum 14 must first pass through the combustor 16 before reaching the interior of the turbine inlet plenum 15. Therefore, pressure internally of the conduit 21 upstream of the check valve elements 27 and 28 is lower than pressure in the valve casing 17 surrounding the conduit 21.

Due to the pressure differential between the interior of the plenum 14 and the turbine inlet plenum 15, any fluid leakage within the mixing valve structure will normally pass from the valve casing 17 into the conduit 21 or turbine inlet plenum 15. Thus, in the event the mixing valve is arranged in an inoperative position, breathable air will flow through the valve casing 17 without being contaminated.

While the gas turbine compressor shown in Fig. 1 of the drawing is operating, the control pressure supply tube 54, in communication with the output of the compressor, furnishes control pressure to the orifice 53, thermostatic valve 51, the diaphragm casing 49, load control valve 58 and thermostatic valve 60. The solenoid valves 55 and 57 are employed during initiation of pneumatic bleed flow through the conduit 20. When it is desired to initiate breathable compressor output flow through the conduit 20, the solenoid valve 55 only is operated. This permits control pressure to pass through the orifice 53 and to the load control valve 58 which is no part of the present invention. This valve 58 controls the flow of uncontaminated breathable air through the conduit 20 in accordance with the co-pending Silver application, hereinbefore referred to. In the event the temperature of the fluid in the turbine discharge duct exceeds a predetermined set temperature, the thermostatic valve 60 opens and vents control pressure in the tube 61. Thus the thermostatic valve 60 overrides the compressor bleed operation and controls the setting of the load control valve 58 when the temperature in the turbine discharge duct exceeds the predetermined set temperature.

After the solenoid valve 55 has been opened and it is desired to initiate hot and cold mixed bleeding of fluid from the gas turbine compressor, the solenoid valve 57 is opened. This permits control pressure, downstream of the orifice 53, to enter the tube 50 in communication with the thermostatic valve 51 and the diaphragm casing 49. As soon as control fluid pressure is exerted upon the diaphragm 48, it acts against compression of the spring 42 and causes the rod 47, in connection with the lever 46, to pivot the rod 44 carrying the yoke 43 which is fixed thereto. As the yoke 43 pivots about the axis of the rod 44 it actuates the links 42 and 42a in connection with the sleeve 36 causing the same to move toward the restriction 18 of the valve casing 17.

Movement of the sleeve 36 effectively extends the conduit 21 toward the restriction 18 whereupon flow through the valve casing 17 is further restricted adjacent to the restriction 18. When the sleeve 36 reaches close proximity to the restriction 18, it creates a pressure drop at the outlet of the conduit 21 whereupon pressure at the inlet of the diffuser 19 is lower than pressure in the turbine inlet plenum 15. A pressure differential then exists across check valve elements 27 and 28 causing them to be opened into the broken line position, as shown in Fig. 5 of the drawing, permitting hot products of combustion to pass through the conduit 21 and mix with compressed air in the valve casing 17.

As the hot and cold fluids are mixed, they pass outwardly through the diffuser 19 in order that pressure of the fluids may be recovered. As shown in Fig. 4 of the drawing, the diameter of the sleeve 36 closely approximates the diameter of the restriction 18, whereby a very efficient mixing of the fluid may be accomplished in relation to subsequent pressure recovery in the diffuser 19. As the mixed fluids pass through the conduit 20 around the sensing element of the thermostatic valve 51, they heat it to a predetermined temperature, at which time it automatically opens and vents control pressure in the tube 50.

Since the flow capacity of the thermostatic valve 51 exceeds the flow capacity of the orifice 53, fluid pressure on the diaphragm 48 is reduced and the spring 52 then overcomes opposing fluid pressure on the diaphragm. The spring 52 then moves the rod 47, lever 46 and the sleeve 36 whereby one end of the sleeve 36 is moved away from the restriction 18 permitting an increased flow of compressed air from the scroll 14 in proportion to the flow of hot gas from the turbine inlet plenum 15. This modulating operation thus slightly reduces the temperature of the mixed fluid in the conduit 20 and automatically provides for an optimum position of the sleeve 36 to meet flow demands of equipment or devices communicating with the conduit 20. As in the case of compressor bleed operation, the thermostatic valve 60 in the turbine discharge duct will override the mixed bleed operation and modulate the load control valve in the event the temperature in the turbine discharge duct exceeds the predetermined set temperature.

In this connection, it will be understood that an increased flow demand will cause a reduction of pressure in the conduit 20. Initially such a reduction of pressure will cause a cooling effect in connection with the thermostat 51 whereby the sleeve 36 will be correspondingly reset in order to induce more hot combustion products to flow through conduit 21. The thermostatic valve 51 is a modulating valve and is sensitive to slight temperature changes which may be induced by an increase or decrease in flow demands which cause corresponding increases or decreases in temperature within the conduit 20.

When it is desired to discontinue a mixed flow of hot and cold fluids through the conduit 20, the solenoid valve 57 is shut off whereby fluid pressure in the tube 50 and diaphragm casing 49 is gradually dissipated due to slight leakage of fluid through the thermostatic valve 51. A decrease in pressure on the diaphragm 48 permits the spring 52 to gradually actuate the mechanism in connection with the sleeve 36 whereupon it is retracted to the position as shown in Figs. 4 and 5 of the drawing. During retraction movement of the sleeve 36, the spreader member 32 engages the inclined cam portions 30 and 31 of the check valve elements 27 and 28, as shown in Fig. 5 of the drawings.

The spreader 32 thus forces the check valve elements 27 and 28 to pivot outwardly toward the solid line position shown in Fig. 5 of the drawing. At this time, the sleeve 36 has been sufficiently retracted so that a pressure differential exists across the check valve elements 27 and 28. This pressure differential is such that a higher pressure exists at the outlet of the conduit 21 than in the turbine inlet plenum 15. The pressure differential then acts upon the check valve elements 27 and 38 to close the same against the seat 26 in the conduit 21.

Continued bleed flow of compressed air from the compressor through the casing 17 and conduit 20 may be maintained while only slight leakage of air from the casing 17 into the turbine inlet plenum 15 occurs. Such slight leakage may be permitted through the hinge portions of the valve elements 27 and 28; since a small amount of leakage into the turbine inlet plenum 15 does not adversely affect the operation of the gas turbine compressor.

We claim:

1. In a mixing valve, the combination of: a casing having a flow restriction therein and disposed to communicate with a first source of fluid; a conduit in said casing near said flow restriction and disposed to communicate with a second source of fluid; means for adjusting the distance between said flow restriction and said conduit to cause an aspiration effect on fluid in said conduit, a check valve in said conduit disposed to prevent flow therethrough in one direction, and an engaging means responsive to movement of said means to partially close said check valve when said means increases the distance between said restriction and said conduit.

2. In a mixing valve, the combination of: a casing having a flow restriction therein, a first source of fluid communicating therewith, a conduit in said casing near said flow restriction and having a second source of fluid communicating therewith, means for adjusting the distance between said flow restriction and said conduit to cause an aspiration effect on fluid in said conduit, a check valve in said conduit disposed to prevent flow therethrough in one direction, and an engaging member carried by said means and disposed to partially close said check valve when said means increases the distance between said restriction and said conduit, said first source of fluid being at a higher pressure than said second source.

3. In a mixing valve; the combination of: a casing having a flow restriction therein, a first source of fluid communicating therewith, a conduit in said casing near said flow restriction and having a second source of fluid communicating therewith, first means for adjusting the distance between said flow restriction and said conduit to cause an aspiration effect on fluid in said conduit, a check valve mounted in said conduit and disposed to prevent flow therethrough in one direction, an engaging member carried by said first means and disposed to partially close said check valve when said first means increases the distance between said restriction and said conduit, second means to conduct fluid from said casing and said conduit, a thermostat in said second means and disposed to communicate with fluids flowing from said conduit and said casing, and third means controlled by said thermostat and disposed to actuate said first means whereby proportional mixing of fluids from said first and second sources maintains a predetermined temperature of mixed fluids delivered from said mixing valve into said second means.

4. In a mixing valve, the combination of: a cylindrical casing having an inlet and an outlet, a first source of fluid pressure communicating with said inlet, a conduit mounted internally of said casing for axial movement, a second source of fluid pressure communicating with said conduit, said second source being at a lower pressure than that of said first source, said casing having a restriction downstream of said conduit, means for axially moving a portion of said conduit toward said restriction to thereby further restrict the same and to reduce pressure downstream of said conduit for aspirating fluid therefrom, a check valve mounted in said conduit to prevent flow from said casing into said conduit when said portion of said conduit is retracted away from said restriction, said check valve having two hinged valve elements pivotally mounted on a pin, the ends of said pin being supported by said conduit, and an engaging member carried by said means and arranged to spread said valve elements apart when said portion of said conduit is retracted away from said restriction whereby said valve elements are projected over sufficient area in said conduit so as to readily close when the pressure in said casing acts on said valve elements.

5. A mixing valve comprising: a tubular valve casing, conduit means for connecting said valve casing to a source of fluid pressure; a tubular member extending into said valve casing, a sleeve member surrounding one end of said tubular member, said sleeve member mounted for extension along the axis of said valve casing; additional conduit means for connecting said tubular member to a second source of fluid pressure, said second source being at a lower pressure than said first source; a restricted opening formed in said valve casing and axially spaced from the said one end of said tubular member; actuating means for axially extending said sleeve member toward or away from said restriction and temperature sensitive means for controlling said actuator in response to the temperature of fluid flowing in said valve casing downstream of said restriction.

References Cited in the file of this patent
UNITED STATES PATENTS

| | | |
|---|---|---|
| 1,413,371 | Adler | Apr. 18, 1922 |
| 1,819,045 | Snediker | Aug. 18, 1931 |
| 2,031,445 | Wiley | Feb. 18, 1936 |
| 2,397,870 | Kneass | Apr. 2, 1946 |
| 2,609,146 | Heikes | Sept. 2, 1952 |
| 2,626,753 | Merrill | Jan. 27, 1953 |
| 2,676,575 | Rosenberger | Apr. 27, 1954 |